April 25, 1961 G. S. BACHMAN 2,981,775

OXIDE THERMOCOUPLE DEVICE

Filed Nov. 12, 1958

INVENTOR.
GEORGE S. BACHMAN
BY Greene, Pinelee and Durr

United States Patent Office 2,981,775
Patented Apr. 25, 1961

2,981,775
OXIDE THERMOCOUPLE DEVICE

George S. Bachman, Metuchen, N.J., assignor to Steatite Research Corporation, Keasbey, N.J., a corporation of Delaware Filed Nov. 12, 1958, Ser. No. 773,351

7 Claims. (Cl. 136—5)

The invention is related in a general way to the phenomenon of thermoelectricity and in a particular way to improvements in thermocouples.

Metallic thermocouples have been in use for many years and are indispensable for many industrial operations. The action of these thermocouples rests upon the fact that an electric current flows continuously in a closed circuit of two dissimilar metals when the junctions of the metals are maintained at different temperatures. This phenomenon is known as the Seebeck effect, and it is one of the basic thermoelectric phenomena. For the highest temperatures noble metal thermocouples, particularly platinum-rhodium couples, are used, but the upper temperature of use for any considerable length of time is about 2800° F., because of volatilization of the metals, with consequent loss of calibration, and grain growth of the metals at these high temperatures. At still higher temperatures less accurate methods, such as those of radiation and optical pyrometry, must be resorted to.

Other limitations of metal wire thermocouples are their lack of ruggedness and susceptibility to chemical attack. To counteract these limitations, thermocouples are often enclosed in protection tubes, but this expedient delays their reaction to temperature changes.

Attempts have been made to develop wire thermocouples for use at temperatures above 2800° F. None of these attempts has resulted in thermocouples which have met with general acceptance. Since the Seebeck effect is not limited to metals, the possibility of using other substances for thermocouples presents itself. However, only graphite, silicon carbide and boron carbide have found a measure of acceptance as materials for high-temperature thermocouples, and in all reported instances graphite was used as one of the legs of the thermocouple. The absorption of moisture by the graphite limits the accuracy of temperature determination. Also, all three materials are subject to oxidation and consequent destruction at high temperatures when exposed to air or other oxidizing atmospheres. Fragility is also a problem.

It is an object of this invention to overcome the limitations outlined previously and to provide thermocouples which can be used to very high temperatures in air or other oxidizing atmospheres, and also in moderately reducing atmospheres and in vacuum. It is another object of this invention to provide thermocouples which resist the action of molten metals, particularly molten steel, and corrosive liquids and gases. It is a further object of this invention to provide thermocouples that are physically strong. Still another object of this invention is to provide thermocouples which generate a constant voltage for extended periods of time. It is a further object of the invention to provide thermocouples that generate a relatively high potential and have good sensitivity. It is a further object of this invention to provide thermocouples in which the two legs can be in physical contact between the hot and cold junctions.

The objects of the invention are attained by uniting two refractory oxide leg bodies of at least slightly different composition to form the thermocouple or thermoelectric element.

This invention depends on the fact that refractory oxides, in common with metals, salts, minerals, etc., show the Seebeck effect, and the magnitude of the E.M.F. generated in a closed circuit of two dissimilar oxide bodies depends upon the temperature difference between the hot and cold junction. Thus, there arises the possibility of using these oxides to construct thermocouples. However, the electrical resistance of substances to be used as thermocouple legs must be fairly low as the legs must conduct electricity even at the cold junction and the electrical resistance of most refractory oxides at ordinary temperatures is high. On the other hand, the electrical resistance of oxides decreases quite rapidly with increasing temperature, so that for each refractory oxide there is a temperature above which the resistance is low enough for the oxide body to be used as the leg of a thermocouple. According to this invention, the cold junction of the thermocouple is maintained at a temperature not lower than that at which the oxide body conducts satisfactorily. For stabilized zirconia, an oxide body with relatively good electrical conductivity at high temperatures, this temperature is about 2000° F.

Some oxide bodies, such as magnetite, and various synthetic or natural modifications thereof known as ferrites, and also lanthanum-strontium manganite and $(ZnO)_{.97}(Al_2O_3)_{.03}$ etc., conduct electricity very well at room temperature.

The legs can be united by preparing moldable mixes of the oxide components of the respective legs, molding the mixes to shape, uniting the molded parts to provide the shape desired and then ceramically firing the resulting unit. The term "sintered body" will be understood to define a body which has been ceramically fired until the particles thereof unite to form a unitary structure.

Figure 1:
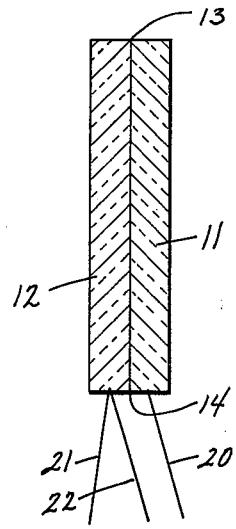
Fig. 1 is a side cross sectional view of a thermocouple made according to the invention.

In the form of invention shown in Fig. 1 the leg 11 is made of lime-stabilized zirconia containing about 15% of ceria and the leg 12 is made of lime-stabilized zirconia. It has been found, for example, that the two legs 11 and 12 need not be physically separated but can be in contact along a plane extending the entire distance from the hot junction 13 to the cold junction end 14 without affecting the E.M.F. output of the thermocouple. Thus, the process of making the thermocouple of Fig. 1 is simplified.

Embedded in the cold junction end of leg 11 is the lead wire 20 which in this case may be platinum since the cold junction end of this thermocouple will still be maintained at a relatively high temperature of about 2000° F., for example.

Embedded in the leg 12 is a second thermocouple 21, 22 which in this case may be a Pt-90 Pt 10 Rh thermocouple. The platinum lead 22 of this thermocouple serves a dual purpose, as the lead for both the ceramic and the metal thermocouples. Since it is necessary to know the temperature of the cold junction (in the past the temperature of the cold junction has been maintained at about ambient or room temperature), this temperature is measured by the thermoelectric effect between wires 21 and 22. The E.M.F. between the wires 20 and 22 is due to the oxide thermocouple.

The device of Fig. 1 may be manufactured by known ceramic procedures. For example, a moldable composition is made by mixing a commercially available, finely ground lime-stabilized zirconia (containing on the order of 3–5% of CaO, for example) with sufficient water to form a paste and, if desired, a binder such as carboxymethyl cellulose. A similar moldable composition is made from the lime-stabilized zirconia and ceria powder. The compositions are molded to shape and pressed together while still in a plastic state. The platinum wire and platinum-rhodium thermocouple are embedded to the proper length into the oxide body while it is still in a plastic condition, and the body is then fired (at 2750° F., for example).

A stabilized zirconia product similar to that shown in Fig. 1 as one leg of a thermocouple had a Seebeck coefficient (sometimes called the "thermoelectric power") of 506 microvolts per degree centigrade when the hot junction was 1353° C. and the cold junction was 1277° C. This shows that the thermoelectric effect for such oxide is quite high. For the majority of metals, the "thermoelectric power" does not exceed a few microvolts per degree centigrade.

Figure 2:
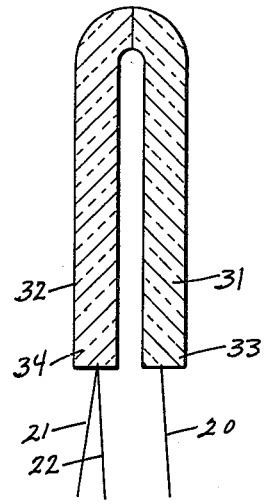
Fig. 2 is a view similar to Fig. 1 of a modified form of the device.

Figure 2 illustrates another oxide thermocouple found to be very practical. Leg 32 of this thermocouple is lime-stabilized zirconia. The other leg 31 is a fired ceramic body composed of $Cr_2O_3$, $Al_2O_3$, and MgO; this body has relatively good electrical conductivity at temperatures of over 1250° C. In this instance the two legs 31 and 32 are not in contact except at the "hot" junction. A Pt-90 Pt 10 Rh thermocouple 21, 22 was embedded in the "cold" end 34 of the fired stabilized zirconia body 31, and a platinum wire 20 was embedded in the "cold" end 33 of the fired $Cr_2O_3$—$Al_2O_3$—MgO body 30. Another Pt-90 Pt 10 Rh thermocouple (not shown) was embedded in the oxide thermocouple at the "hot" junction in order to measure "hot" junction temperatures for calibrating and experimental purposes. The noble metal wires led to a potentiometer at room temperature. The E.M.F. output of this oxide thermocouple was 7.80 millivolts when the "hot" junction temperature was 1353° C. and the "cold" junction temperature 1277° C.

Figure 3:
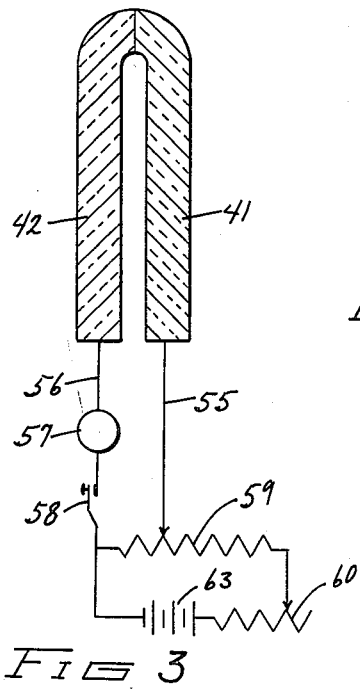
Fig. 3 is a view similar to Fig. 1 of still another modified form of the invention.

This invention is not limited to bodies made of refractory oxides which conduct well electrically only at high temperature. Some oxides and oxide combinations conduct well at room temperature; among these may be mentioned magnetite ($Fe_3O_4$), various natural and artifically made compositions based on the magnetite structure known as ferrites $(NiO)_{.90}(Li_2O)_{.10}$, lanthanum-strontium manganite, and $(ZnO)_{.97}(Al_2O_3)_{.03}$. These and similar oxides may be employed as thermocouple elements that are effective with a cold junction at about or even below room temperatures, thus eliminating the need for lead wires that will withstand high temperatures. Also, these oxide bodies are useful in thermocouples that have both hot and cold junctions in the relatively low-temperature range, with greater sensitivity of temperature measurement than that of the metal thermocouples. Figure 3 illustrates a thermocouple in which $Fe_3O_4$, a "defect" conductor, and $(ZnO)_{.97}(Al_2O_3)_{.03}$, an "excess" conductor, make up the two legs 42 and 41, respectively. These two types of conductors 41, 42 when used together create an especially high E.M.F. for a given temperature difference between "hot" and "cold" junctions.

Figure 4:
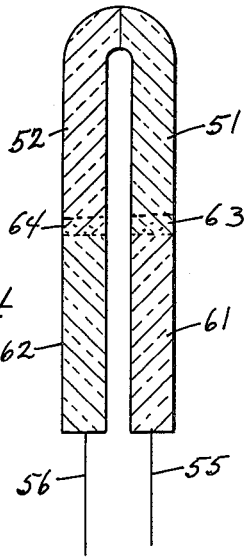
Fig. 4 is a view similar to Fig. 1 of another modified form of the invention.

Alternatively, the oxide compositions of Fig. 3, for example, that conduct well at room temperature can be combined as the lower-temperature portions of thermocouple legs as shown at 61, 62 of Fig. 4, while oxides that are electrically conducting and more stable at higher temperatures make up the higher-temperature portions 51 and 52, respectively, of the same thermocouple legs, thus creating a composite thermocouple which does not need lead wires that will withstand high temperatures. Transition zones 63 and 64 are formed where the legs 51 and 52 are united to legs 61 and 62, respectively. The lead wires 55 and 56 of Figs. 3 and 4 may be of any desired conducting material such as copper, copper alloys, aluminum, etc.

Fig. 3 discloses a circuit to complete the connection between the thermocouple. The line 56 is connected to one side of galvanometer 57. The other side of galvanometer 57 is connected by switch 58 to a potentiometer comprising slide wire resistances 59, 60 and battery 63.

It should be understood that, within the scope of the appended claims, the invention may be practiced otherwise than as specifically illustrated and described.

I claim:

1. A thermocouple device comprising a pair of sintered oxide legs, a sintered hot junction between the two legs at one end thereof, the first of said legs consisting essentially of at least one mixed oxide selected from the group consisting of zirconium oxide stabilized with about 3–5% of CaO, zirconium oxide plus about 15% of ceria and stabilized with about 3–5% of CaO, $Fe_3O_4$, ferrites, $(NiO)_{.90}(Li_2O)_{.10}$, lanthanum-strontium manganite, and $(ZnO)_{.97}(Al_2O_3)_{.03}$, the second of said legs consisting essentially of a different one of said oxide mixtures.

2. The thermocouple device as claimed in claim 1 wherein at least one of said legs consists essentially of sintered zirconia stabilized with CaO as the major component.

3. The thermocouple device as claimed in claim 1 wherein one of said legs consists essentially of zirconia stabilized with CaO and the other of said legs contains zirconia as the major component and ceria.

4. The thermocouple device as claimed in claim 1, comprising a metallic thermocouple embedded in one of said legs at the end opposite the hot junction.

5. The thermocouple device as claimed in claim 1 comprising a first sintered metal oxide extension united by sintering to the end of the first leg opposite the hot junction, and a second sintered metal oxide extension united to the corresponding end of said second leg, the first and second extensions comprising as a principle component a metal oxide composition which acts as a conductor of electricity at room temperature.

6. The thermocouple device as claimed in claim 4 wherein the two legs thereof are of similar shape and are united along a longitudinal area extending from the hot junction to the cold junction thereof.

7. The thermocouple device as claimed in claim 1, wherein each of the two legs thereof has a flattened longitudinal area extending from the hot junction to the opposite end thereof, said legs being united along said flattened longitudinal area.

References Cited in the file of this patent

UNITED STATES PATENTS

| | | |
|---|---|---|
| 2,675,417 | Heibel | Apr. 13, 1954 |
| 2,912,477 | Fischer et al. | Nov. 10, 1959 |